United States Patent
Murai et al.

[11] Patent Number: 5,938,075
[45] Date of Patent: Aug. 17, 1999

[54] POWDER FEEDER AND METHOD FOR DRIVING POWDER FEEDER

[75] Inventors: Katsumi Murai; Mamoru Tateishi; Masaki Ikeya, all of Obu, Japan

[73] Assignee: Aisan Kogyo Kabushiki Kaisha, Japan

[21] Appl. No.: 08/855,357

[22] Filed: May 13, 1997

[30] Foreign Application Priority Data

May 17, 1996 [JP] Japan .................................. 8-122092

[51] Int. Cl.$^6$ .................................................. B67B 7/00
[52] U.S. Cl. ............................................. 222/1; 222/200
[58] Field of Search ................................. 222/196, 200, 222/203, 1; 310/316, 317; 366/116

[56] References Cited

U.S. PATENT DOCUMENTS

| 4,972,970 | 11/1990 | Toerner | 222/1 |
| 5,735,439 | 4/1998 | Heinrici et al. | 222/203 |

Primary Examiner—Gregory L. Huson
Attorney, Agent, or Firm—Finnegan, Henderson, Farabow, Garrett & Dunner, L.L.P.

[57] ABSTRACT

This invention provides a method for driving intermittently a vibrator having a resonance frequency with the resonance frequency in which the vibration of the resonance frequency is attenuated promptly after the ending of driving with the resonance frequency and the vibration of the resonance frequency increases promptly after the starting of driving with the resonance frequency. Further, this invention provides a method for driving powder feeders using ultrasonic motors which are easy to control powder feed rates and further provides powder feeders. A powder feed pipe is attached to an ultrasonic motor the end of which is elliptically vibrated with the resonance frequency, and powder P is fed from the hopper body when AC voltages of the resonance frequency and non-resonance frequency are applied alternately to the piezoelectric element 1 of the ultrasonic motor.

9 Claims, 9 Drawing Sheets

FIG. 3
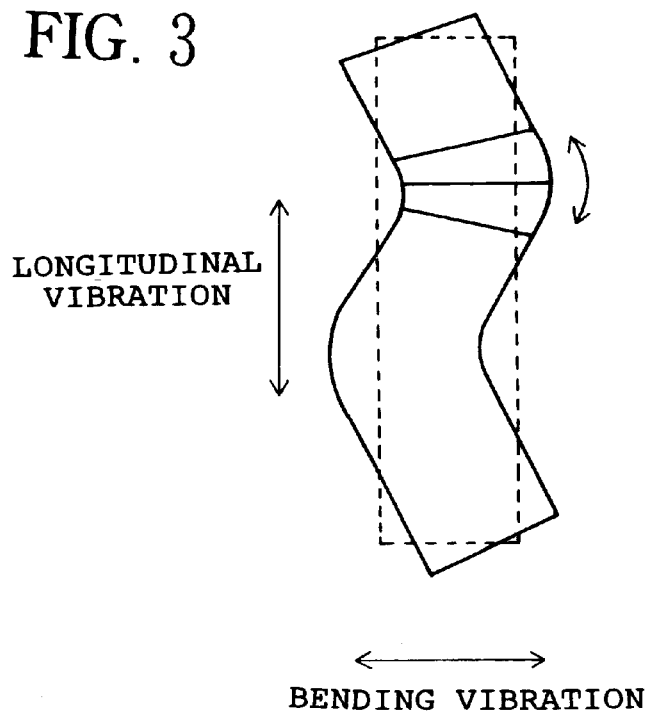
LONGITUDINAL VIBRATION
BENDING VIBRATION
FIG. 4(a)
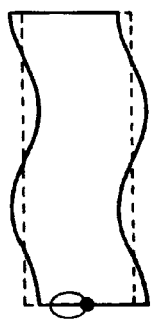
t = 0
FIG. 4(b)
t = $\frac{1}{2}$
FIG. 4(c)
t = $\pi$
FIG. 4(d)
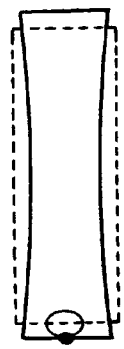
t = $\frac{3}{2}$

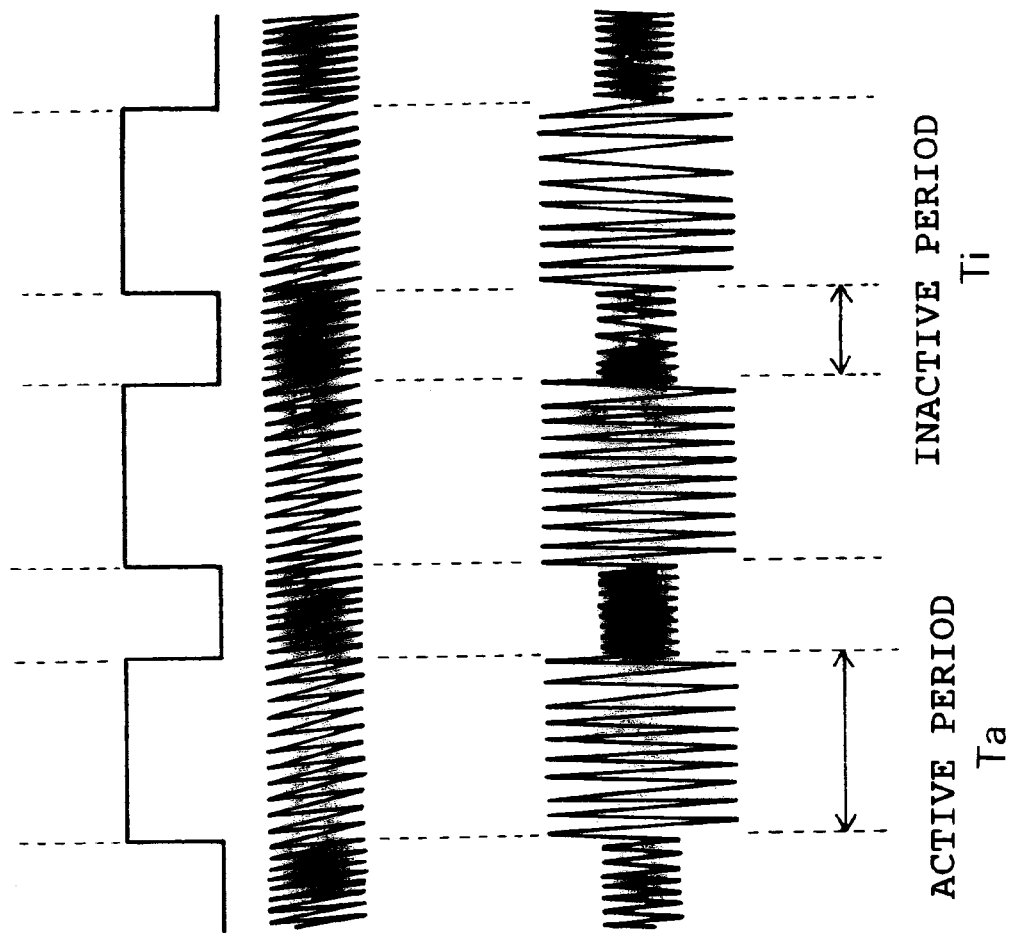

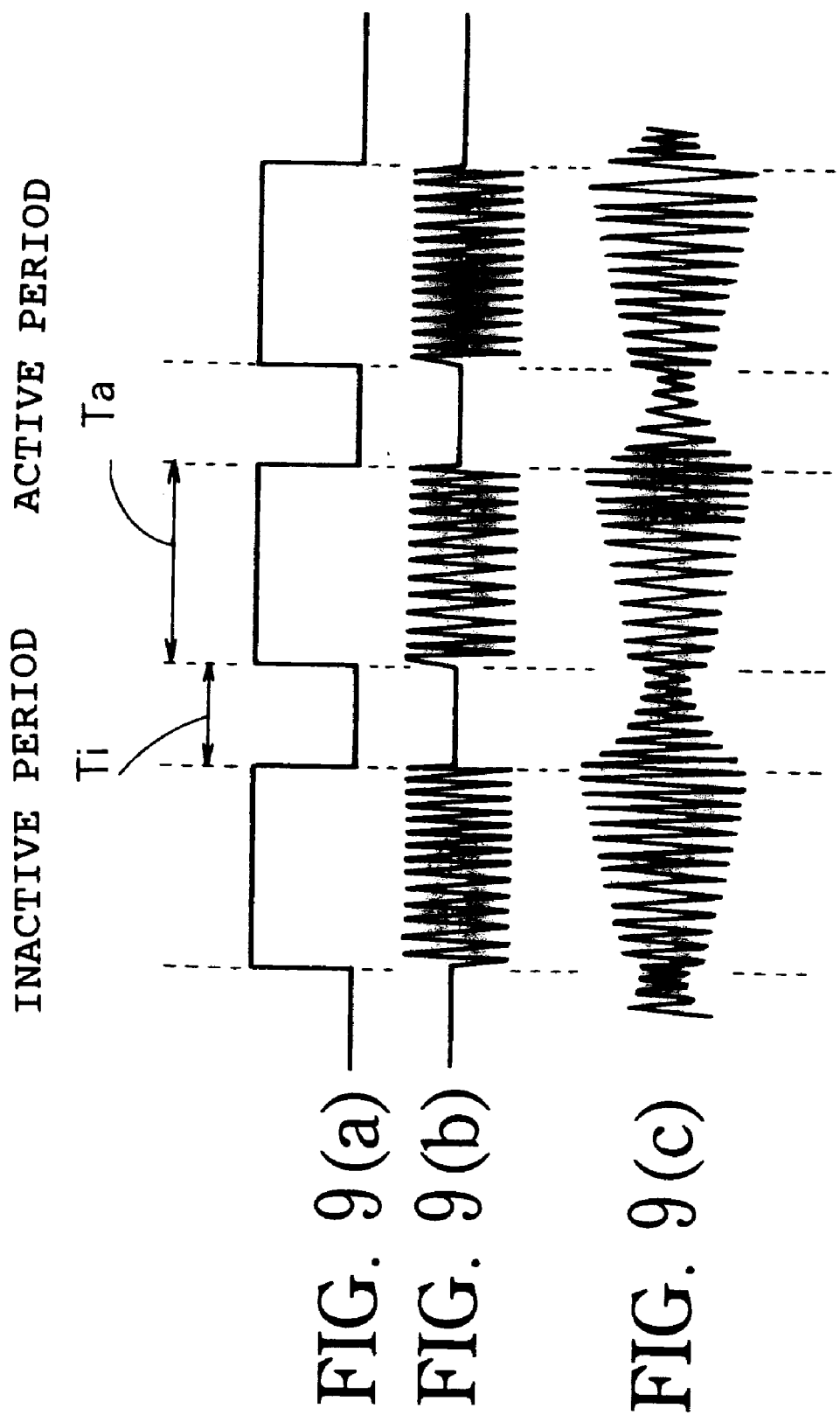

POWDER FEEDER AND METHOD FOR DRIVING POWDER FEEDER

BACKGROUND OF THE INVENTION

1. Field of the Invention

This invention relates to a method for driving a vibrator having a resonance frequency with the resonance frequency intermittently, and particularly relates to a method for driving powder feeders and a powder feeder capable of performing such driving method.

2. Description of the Related Art

In the case that a vibrator having a resonance frequency is driven in the resonance region (resonance point) continuously, it is difficult to control accurately the output such as the amplitude at the resonance point by way of a driving force (for example driving voltage). In view of such difficulty, a method in which the output is controlled by supplying driving force intermittently has been used. For example, a driving voltage is applied intermittently to control the operation time per one cycle (duty ratio) namely the time average output.

Such control is performed, for example, using a circuit shown in the block diagram of FIG. 8. In detail, the output from a resonance frequency oscillation circuit which is oscillating with the resonance frequency and the output from the duty ratio control clock generation means for changing the duty ratio are supplied to an AND circuit (product) to generate the product, and the product output is amplified and applied to the vibrator.

As a motor capable of such controlling, for example, an ultrasonic motor using a piezoelectric transducer has been known. In a piezoelectric transducer, the mechanical deformation of a piezoelectric element caused by electric energy is used to generate mechanical vibration of a vibrator and the output of the ultrasonic motor is changed by changing the duty ratio of the driving voltage.

For example, an ultrasonic resonator which generates both axial vibration (longitudinal vibration) and bending vibration generates elliptic oscillation with the resonance frequency. A pipe is attached to the end of the resonator, and powder is fed in the pipe, then the powder is moved in the certain direction, this mechanism can therefore be used as a powder feeder. In this case, also an AC driving voltage of the resonance frequency is applied to the resonator intermittently to control the feeding rate of the powder.

In some cases, driving force having resonance frequency is applied intermittently in order to obtain pulse vibration. In the case of a fish detector for investigating topography of sea floor or fishes by transmitting ultrasonic wave into water and by detecting reflected echo, a driving voltage of a resonance frequency is applied intermittently into water to transmit ultrasonic wave into water. On the other hand, after the transmission of ultrasonic wave the vibration is stopped, and an echo is received from water, and thus the fish detector serves as a sensor for catching the information in water.

Similar examples include an ultrasonic wave sensor for detecting the existence of some objects in air by emitting ultrasonic wave into air and detecting reflected ultrasonic wave from an object and an ultrasonic range finder for measuring the distance by measuring reflection time of the ultrasonic wave.

However, when a vibrator is driven as described herein above intermittently, after the stopping of driving force, the vibrator still vibrates in free vibration for a while. For example, a driving voltage of a resonance frequency is applied and then the voltage supply is stopped, when, the vibrator continues vibration and the amplitude of the vibration decreases gradually. Therefore, if the duty ratio is large, that is, the period while the driving voltage is not applied is short, the next vibration starts before this vibration ceases completely as shown in FIG. 9. FIG. 9A shows a cycle in which an active period (period while a driving voltage is applied) shown with High, and an inactive period (period while a driving voltage is not applied) is shown with Low. FIG. 9B shows the change of a driving voltage, and FIG. 9C shows the vibration of a vibrator.

On the other hand, when a vibration starts with a resonance frequency, the amplitude of a vibrator increases gradually up to the stationary amplitude. Therefore as shown in FIG. 9C, it takes some time from the starting of driving with a resonance frequency to the saturation of amplitude (stationary amplitude) through the gradual increase of the amplitude. Accordingly, even if the vibrator is driven by the driving wave as shown in FIG. 9B, the magnitude of vibration of a vibrator is only changed as shown in FIG. 9C and the vibrator is not ceased. Further, after a starting of driving, the amplitude increases gradually, therefore the vibration wave form is greatly different from the driving wave form shown in FIG. 9B.

To the contrary as shown in FIG. 10A, in the case that the duty ratio is small, that is, the period while a driving voltage is applied is short, the driving period ends before the vibration reaches the sufficient amplitude (refer to FIG. 10C), and the vibrator continues free vibration for a while after ending of a driving period. FIGS. 10A, B, and C represents the same references corresponding to figures in FIG. 9 respectively.

Accordingly, the vibration wave form similar to that of the driving wave form can not be obtained in the intermittent vibration of a vibrator having the resonance frequency. Such vibration wave form does not provide the output which is proportional to the duty ratio, and the linearity of output of apparatuses such as ultrasonic motors and powder feeders which utilize such vibration is adversely affected.

Further, a resonator of a fish detector and ultrasonic range finder does not output the rectangular ultrasonic output pulse, and the gradually increasing wave form causes an error of the time difference between the transmission and receiving of the reflected wave, the long lasting free vibration prevents the measurement of the reflected wave.

The present invention has been accomplished in view of these problems, and it is an object of the present invention to provide a method for driving a vibrator in which, for driving intermittently a vibrator having a resonance frequency with the resonance frequency, the vibration of the resonance frequency is attenuated promptly after the ending of the driving with the resonance frequency and the vibration of the resonance frequency increases promptly after the starting of the driving with the resonance frequency.

Further, it is another object of the present invention to provide a method for driving a powder feeder using an ultrasonic motor which is easily controllable to feed powder and to provide a powder feeder.

SUMMARY OF THE INVENTION

Means according to a first aspect of the present invention to achieve the above-mentioned objects is a method for driving a vibrator having a resonance frequency with the resonance frequency intermittently, in which the vibrator is driven with a non-resonance frequency at least in any one of the periods just before and just after the period while the vibrator is driven with the resonance frequency in the period while the vibrator is not driven with the resonance frequency.

The intermittent driving implies the driving in which the period of driving with the resonance frequency and the period of no driving with the resonance frequency are alternated, and the periods may not necessarily be repeated constantly.

The vibrator having a resonance frequency driven with the resonance frequency intermittently may be a machine which is vibrated with a motor or a vibrator which converts electric and magnetic energy to mechanical energy using a piezoelectric element, electrostrictive element, or magnetostrictive element.

The driving with a non-resonance frequency just before the driving with the resonance frequency leads to the prompt increase of amplitude after the starting of driving with the resonance frequency. Therefore, the sufficiently large amplitude is obtained even if the driving period with the resonance frequency is short. In other words, the initial driving period with the resonance frequency is almost rectangular in shape of the vibration wave form (amplitude).

On the other hand, the driving with a non-resonance frequency just after the driving with the resonance frequency leads to the prompt decrease of free vibration of the resonance frequency. Therefore, the period of no free vibration of the resonance frequency is acquired even if the interval between the driving periods with the resonance frequency is short. In other words, the terminal driving period with the resonance frequency is almost rectangular in shape of the vibration wave form (amplitude).

The driving period with a non-resonance frequency may be provided either just before or just after the driving period with the resonance frequency depending on the using method of the vibrator, but the driving period with a non-resonance frequency is provided both just before and just after the driving period with the resonance frequency, in other words, a driving period with the resonance frequency is interposed between two driving periods with a non-resonance frequency, thereby the vibration of the resonance frequency becomes more rectangular favorably.

The non-resonance frequency may be a frequency which is different from the resonance frequency, and may be higher or may be lower, however, if the vibration of the vibrator includes other frequencies, the non-resonance frequency is not preferably such resonance frequencies, in detail, because the vibration often includes other resonance frequencies of multiple integer of the resonance frequency and resonance frequencies of 1/(multiple of 2) of the resonance frequency, it is suitable to avoid such other resonance frequencies.

In accordance with the further purpose of the invention, in the method for driving a vibrator of the present invention, wherein the vibrator is driven with a non-resonance frequency in the period while the vibrator is not driven with the resonance frequency.

The driving with a non-resonance frequency can suppress promptly the vibration of the resonance frequency after the ending of driving with the resonance frequency.

Also, the driving with a non-resonance frequency can increase promptly the amplitude to the stationary amplitude after the starting of driving with the resonance frequency.

In accordance with the further purpose of the invention, in the method for driving a vibrator of the present invention, the frequency of an AC driving voltage applied to the vibrator is changed alternately between the resonance frequency and a non-resonance frequency.

The applied AC driving voltage may be different between the resonance frequency and non-resonance frequency, but excessively small voltage of the non-resonance frequency is not preferable, because residual vibration of the resonance frequency can not be suppressed sufficiently or the amplitude increases not promptly after the starting of driving with the resonance frequency.

As the method for changing the frequency alternately, a method, in which outputs of two oscillation circuits of an oscillation circuit oscillating with the resonance frequency and an oscillation circuit oscillating with a non-resonance frequency are switched alternately and applied, may be used. Alternatively, the oscillation frequency itself may be changed by changing the oscillation condition of an oscillation circuit, for example, the oscillation frequency is easily controlled by means of VCO (voltage control oscillator).

In accordance with the still further purpose of the invention, in the method for driving a vibrator of the present invention, the vibrator is a vibrator having an electric-mechanical energy conversion element as the driving source.

The electric-mechanical energy conversion element is an element which converts electric input to mechanical deformation, in detail, includes a piezoelectric element, electrostrictive element, and magnetostrictive element.

In the use of these elements as the driving source, mechanical deformation can be easily obtained by applying a voltage.

Examples of the vibrator having a piezoelectric element include fish detection vibrators used for hydroacoustic generation of a fish detector, air ultrasonic vibrators used for ultrasonic range finders and ultrasonic sensors, ultrasonic vibrator used for fusing, processing, and cutting of plastics, and ultrasonic motors.

In accordance with the purpose of the invention and to achieve the above-mentioned objects, a method is provided for driving a vibrator of a powder feeder provided with a vibrator having the end which is brought into elliptic motion by applying a prescribed resonance frequency to a piezoelectric element, a powder feed passage formed at the end of the vibrator, and a hopper for storing and feeding powder into the powder feed passage, and the frequency of an AC driving voltage applied to the piezoelectric element is changed alternately between the resonance frequency and a non-resonance frequency.

Because the end is brought into elliptic motion, the powder feed pipe attached to the end is also brought into elliptic motion. Powder fed into the pipe from the hopper receives acceleration in the horizontal direction (in the direction perpendicular to the longitudinal vibration of the vibrator and in the direction parallel to the bending vibration direction of the vibrator) and is moved. Thus the powder is fed.

When, the frequency of an AC driving voltage applied to a piezoelectric element is changed alternately between the resonance frequency and a non-resonance frequency, powder is fed in the period while the vibrator is driven with the resonance frequency. On the other hand, the end of the vibrator is not in elliptic motion in the period while the vibrator is driven with a non-resonance frequency, and the powder is not fed.

The amplitude increases promptly upon the starting of driving with the resonance frequency and powder is fed, and the elliptic motion is suppressed promptly upon the ending of driving with the resonance frequency, and the powder is not fed.

Accordingly, by changing the ratio of the driving period with the resonance frequency to the total of the driving period with the resonance frequency and the driving period with a non-resonance frequency, namely duty ratio, the powder feed rate is controlled accurately.

In accordance with the further purpose of the invention and to achieve the above-mentioned objects a powder feeder is provided with a vibrator having the end which is brought into elliptic motion by applying a prescribed resonance frequency to a piezoelectric element, a powder feed passage formed at the end of the vibrator, a hopper for storing and feeding powder into the powder feed passage, and a circuit for applying an AC driving voltage of the resonance frequency and a non-resonance frequency to the piezoelectric element alternately.

An example of a driving circuit for applying a AC driving voltage of the resonance frequency and a non-resonance frequency alternately to the piezoelectric element includes the driving circuit in which outputs of two oscillation circuits of an oscillation circuit oscillating with the resonance frequency and an oscillation circuit oscillating with a non-resonance frequency are switched alternately and applied to the piezoelectric element. Alternatively, a driving circuit, in which an oscillation circuit for changing the oscillation frequency itself by changing the oscillation condition is incorporated, may be used, for example, VCO (voltage control oscillator) may be used as the oscillation circuit.

In accordance with the further purpose of the invention, in the powder feeder of the present invention, the driving circuit is provided with a resonance frequency oscillation circuit for oscillating with the resonance frequency, a non-resonance frequency oscillation circuit for oscillating with the non-resonance frequency, switching means which is switching the output alternately between the output of the resonance frequency oscillation circuit and the output of the non-resonance frequency oscillation circuit, and a power amplification circuit for amplifying the output from the switching means and applying it to the piezoelectric element.

By using the driving circuit as described herein above, an AC driving voltage switching between the resonance frequency and a non-resonance frequency alternately is generated easily and applied to a piezoelectric element.

As the switching means, OR output of the AND output from a switching signal and resonance frequency oscillation circuit output and the inverter AND output from a switching signal and non-resonance frequency oscillation circuit output may be preferably obtained.

BRIEF DESCRIPTION OF THE DRAWINGS

FIG. 3 is a schematic diagram for illustrating the vibration of the vibrator when in resonance.

FIG. 4 is a set of schematic diagrams for illustrating the vibration of the vibrator when in resonance in the time interval of ¼ cycle.

FIG. 5 is a set of diagrams for illustrating the relationship between a voltage applied to the vibrator and the vibration, A shows the clock for switching alternately between the active period and inactive period, B shows the driving voltage applied to the piezoelectric element of the vibrator, and C shows the amplitude of the vibrator.

FIG. 9 is a set of diagrams for illustrating the driving and vibration of the vibrator for a high duty ratio in the driving method in accordance with the conventional art, A shows the timing for switching alternately between the driving period and non-driving period, and B shows the driving force applied to the vibrator, and C shows the amplitude of the vibrator.

DETAILED DESCRIPTION OF THE PREFERRED EMBODIMENTS

Figure 1:
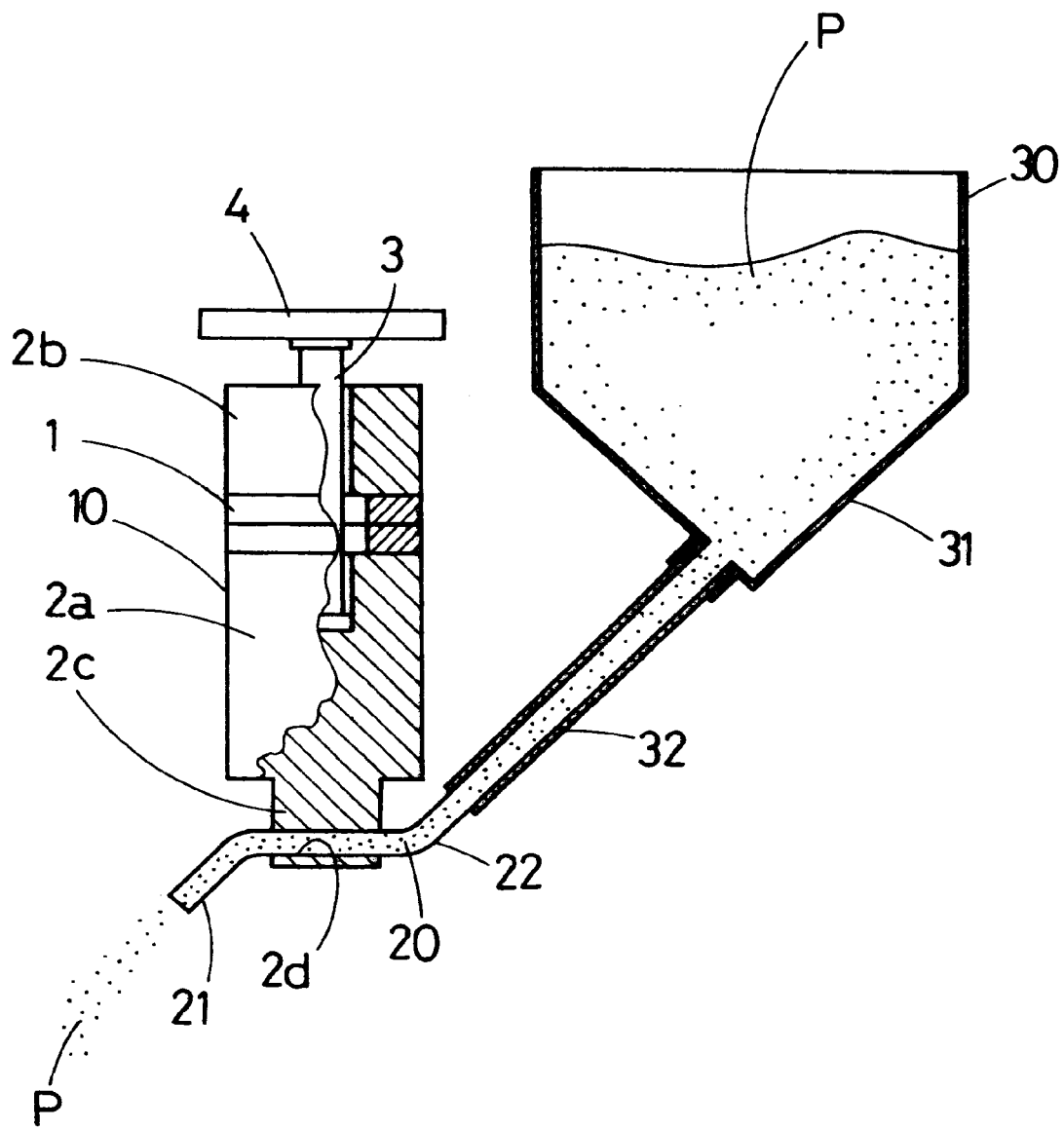
FIG. 1 is a partially cut-away cross-sectional view for illustrating the structure of a powder feeder of the embodiment of the present invention.

An embodiment in accordance with the present invention will be described in detail hereinafter referring to the drawings. The structure of a powder feeder in accordance with the present invention is shown in FIG. 1.

The vibrator 10 is a so-called linear type ultrasonic motor, two flat ring piezoelectric elements 1 are stacked with interposition of an electrode not shown in the figure, and placed between an approximately cylindrical metal horn 2a and an approximately hollow cylindrical metal back horn 2b. The vibrator 10 is fixed to a fixing member 4 with a bolt 3, which is fastened to the horn 2a at the one end, inserted through a through hole which extends through the back horn 2b and piezoelectric element 1 at the center.

The end 2c of the horn 2a is double flatted and provided with a through hole 2d for being inserted with a pipe as described hereinafter.

A powder feed pipe 20, in the inner part of which the powder circulates, is inserted and fixed to the through hole 2d. The end 21 of the powder feed pipe 20 locating in the left side of the figure is bent slightly downward to help powder P fed from the right side in the figure to drop from the end 21 of the pipe 20.

On the other hand, the other end 22 of the pipe 20 in the right side of the figure is bent slightly upward to help powder P fed from a hopper body 30 to move to the left side in the figure.

The hopper body 30 is provided for storing powder P and feeding slowly powder P to the pipe 20, the bottom 31 has a funnel configuration. A tube 32 is connected to the bottom 31, and the other end of the tube 32 is connected to the end 22 of the powder feed pipe 20. Accordingly, powder P charged in the hopper body 30 is fed to the pipe 20 through the tube 32. The tube 32 made of flexible material is selected so as not to suppress the vibration of the vibrator 10, in this embodiment a nylon tube is used.

Figure 2:
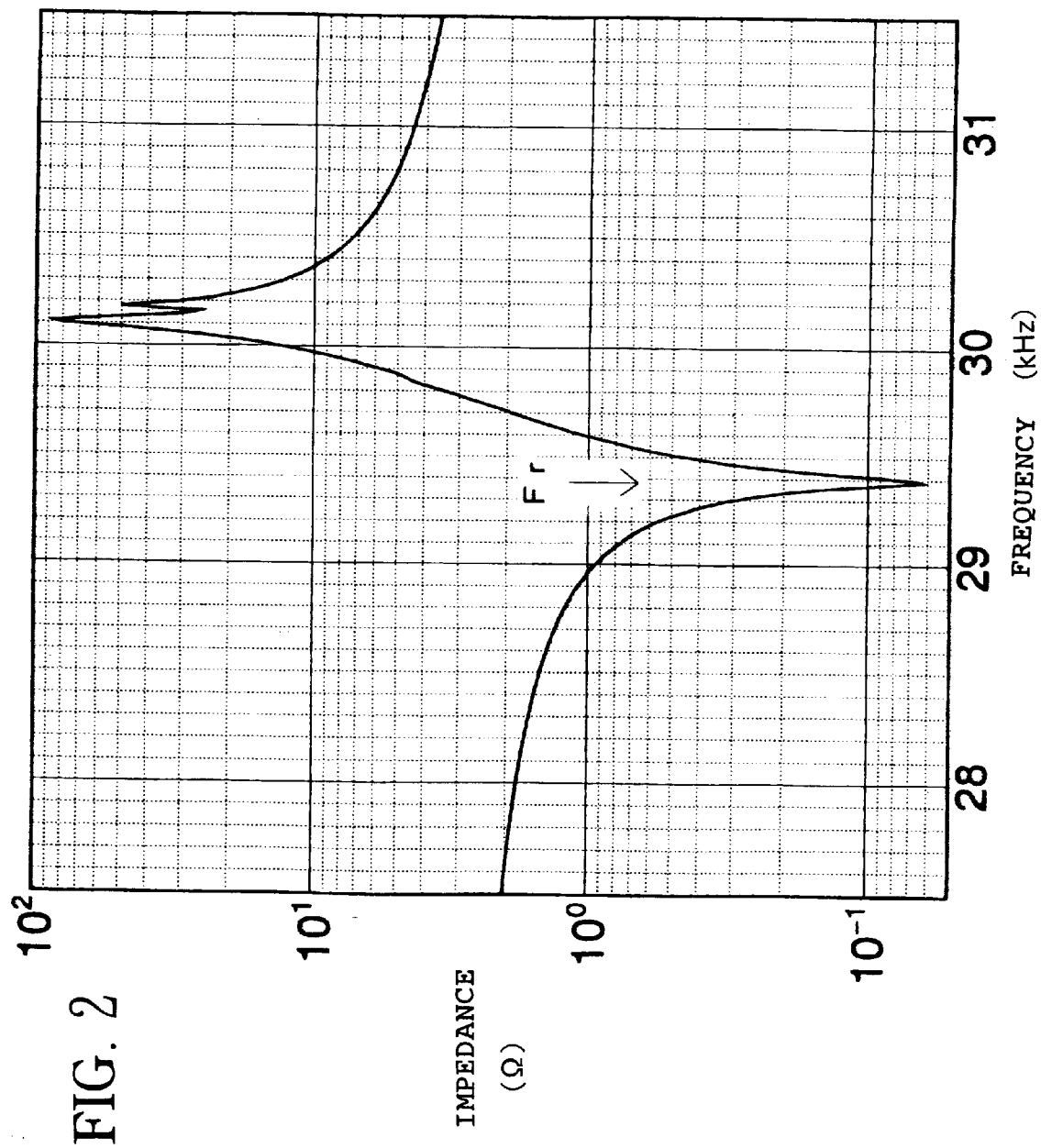
FIG. 2 is a graph for describing the frequency characteristics of input impedance of the vibrator.

FIG. 2 shows the result of measurement of the input impedance frequency characteristics of the vibrator 10 measured by means of an impedance analyzer. From this result, it is obvious that the resonance frequency Fr of the vibrator 10 is about 29.4 kHz. The driving with this resonance frequency Fr generates large vibration. On the other hand, the driving with frequency different from the resonance frequency, namely non-resonance frequency, generates scarce vibration because driving energy can not enter due to high impedance.

The vibration is described for the case that the vibrator 10 is vibrated with the resonance frequency.

The vibration of the piezoelectric element 1 with the resonance frequency causes the extension-shrinking deformation of the piezoelectric element 1, and the vibrator 10 is bending-vibrated as shown in FIG. 3. This bending vibration is a resultant motion of the extension shrinking motion in the vertical direction in the figure (longitudinal vibration) and bending vibration in the horizontal direction in the figure (flexing vibration).

One cycle of this vibration is described in detail in FIG. 4. For easy understanding of the motion of the end (the bottom end in the figure), the end is marked with a black dot at the center in FIG. 4. First at t=0 (FIG. 4A), the end (black dot) is bent so as to deviate to the right side. Next, after ¼ cycle at t=π/2 (FIG. 4B), the vibrator 10 shrinks and the end (black dot) deviates to the upper side. Further, at t=π (FIG. 4C), the end (black dot) is bent so as to deviate to the left side. After the additional ¼ cycle at t=3π/2 (FIG. 4D), the vibrator 10 is extended, and the end (black dot) deviates to the lower side in the figure. Accordingly, the tracing of the black dot for one cycle shows an elliptic motion as shown in FIG. 4.

Therefore, a pipe is attached to this end and powder is fed in the pipe, then the powder is accelerated in the left direction with floating motion, and moved to the left side.

However, by way of the conventional driving method for adjusting the powder feed rate, the change of the duty ratio, that is, changing of the driving time proportion with the resonance frequency, is not proportional to the powder feed rate.

In the present invention, in the period between two periods while the vibrator is driven with the resonance frequency, the vibrator is driven with non-resonance frequency.

The method for driving is described referring to FIG. 5.

FIG. 5A shows a timing clock for switching the driving frequency alternately between resonance frequency and non-resonance frequency. In FIG. 5A the period while the vibrator is driven with the resonance frequency (active period) Ta is referred to as High, and the period while the vibrator is driven with non-resonance frequency (inactive period) Ti is referred to as Low. The duty ratio is expressed as the proportion of resonance frequency driving period in a cycle and calculated by Ta/(Ta+Ti).

FIG. 5B shows the change of driving voltage applied to the piezoelectric element 1. The magnitude of the applied voltage itself is not changed, an AC voltage of the resonance frequency Fr is applied in the active period Ta, on the other hand, an AC voltage of a non-resonance frequency is applied in the inactive period Ti. 300 kHz is selected as the non-resonance frequency Fi.

The application of the driving voltage as shown in FIG. 5B generates the vibration of the vibrator 10. The driving with the resonance frequency Fr causes the resonance of the vibrator 10 to vibrate with large amplitude, and the end is brought in elliptic motion.

On the other hand, the driving with the non-resonance frequency Fi scarcely causes vibration and does not cause the elliptic motion.

Accordingly, as shown in FIG. 5C, the magnitude of vibration (amplitude) is significantly different between the active period and inactive period though the applied voltage is the same. Powder P is fed in the active period, on the other hand, powder P is not fed in the inactive period.

Because, in the time between the active periods Ta, the vibrator 10 is driven with the non-resonance frequency Fi (inactive period Ti), following advantages are obtained.

① After the ending of an active period, the vibration of the non-resonance frequency starts promptly, and the vibration results in the suppressed free vibration of the resonance frequency. The phenomenon that the free vibration of the vibrator 10 still continues to feed powder P after the starting of an inactive period is eliminated.

② After the starting of an active period, the vibration of the resonance frequency increases promptly to the stationary amplitude. In other words, from just after the starting of an active period, powder P is fed at a prescribed rate.

Because powder P is fed at a prescribed rate only in the active period, the feed rate of powder P is adjusted accurately by changing the duty ratio.

The relationship between the duty ratio and powder feed rate (g/10 sec) is obtained for the above-mentioned powder feeder. For comparison, the same relationship between the duty ratio and powder feed rate is obtained for a powder feeder of the conventional art in which vibration of the non-resonance vibration is not operated in the inactive period.

Figure 6:
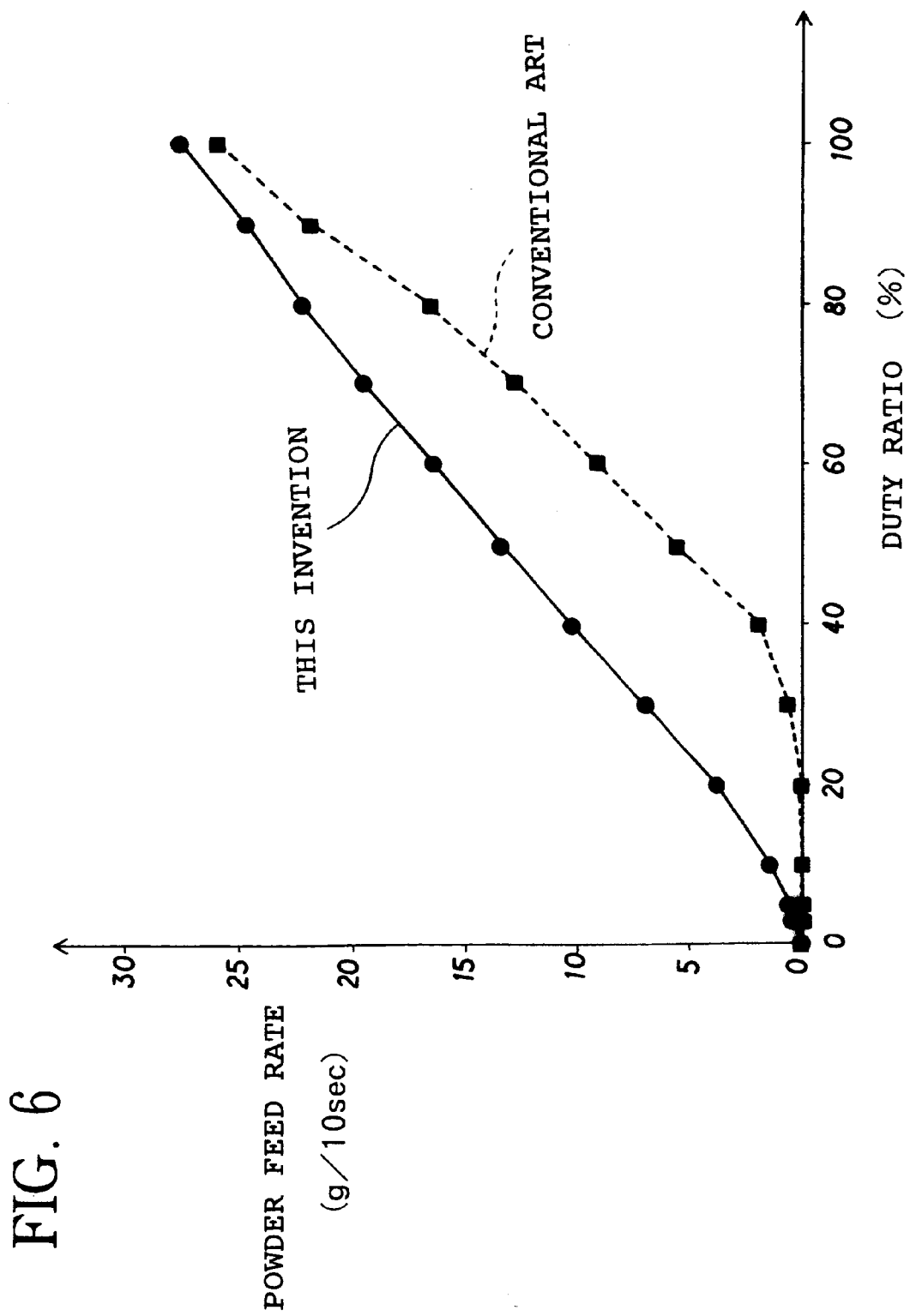
FIG. 6 is a graph for describing the relationship between the duty ratio and the powder feed rate when powder is fed using a powder feeder employing this invention and conventional art.

The result is shown in FIG. 6. The solid line shows the result of the present invention, and the rough dotted line shows the result of conventional driving. As obvious from the result shown in FIG. 6, the linearity is remarkably improved in comparison with the conventional art, the powder feed rate increases in proportion to increasing of the duty ratio.

Figure 10A:
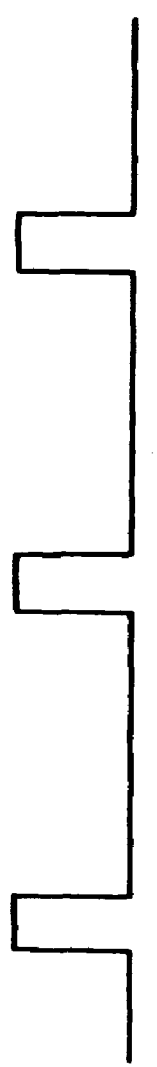
FIG. 10 is a set of diagrams for illustrating the driving and vibration of the vibrator for a low duty ratio in the driving method in accordance with the conventional art, A shows the timing for switching alternately between the driving period and non-driving period, and B shows the driving force applied to the vibrator, and C shows the amplitude of the vibrator.
Figure 10B:
Figure 10C:

In the conventional art, particularly in the low duty ratio region (a region below 40% in this embodiment), the powder feed rate is low. The reason is attributed to the fact that, in the small duty ratio region, the vibration ends before the vibration increases sufficiently through the driving starts with the resonance frequency and thus powder is scarcely fed in the active period Ta as described referring to FIG. 10.

On the other hand, in the high duty ratio region (the region exceeding 40% in this embodiment), the powder feed rate increases sharply. This sharp increase is attributed to the fact that the vibrator continues free vibration in the inactive period to feed powder P as described referring to FIG. 9.

According to the driving method of the present invention, the amplitude increases promptly in the active period to feed powder P, and does not feed the powder P in the inactive period, the relationship between the duty ratio and the powder feed rate is linear. Therefore, the powder feed rate can be controlled accurately in spite of low duty ratio.

The result is shown herein above for the non-resonance frequency Fi=300 kHz, and Fi=10 kHz gives the similar result.

Figure 7:
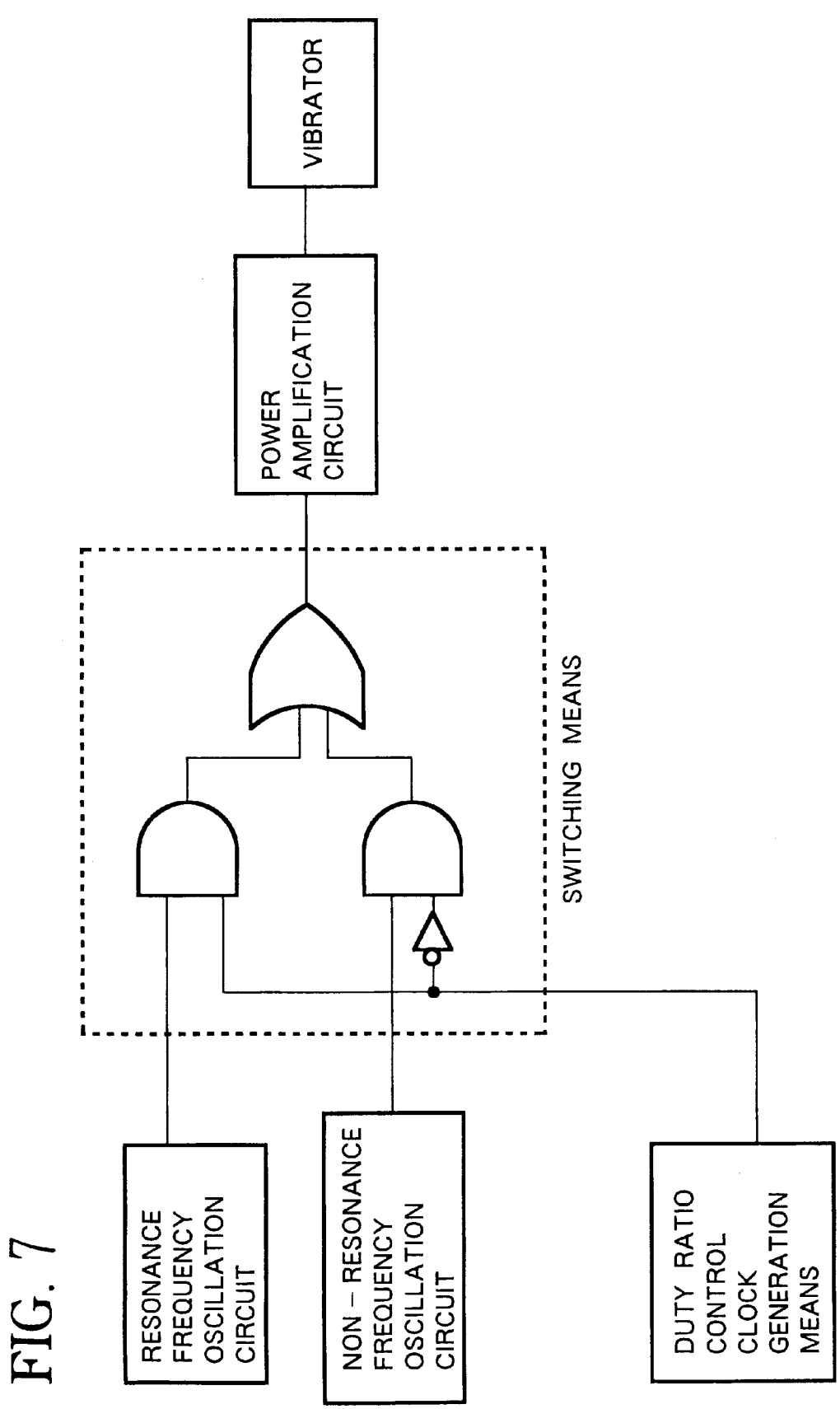
FIG. 7 is a block diagram for illustrating a driving circuit in accordance with the present invention.
Figure 8:
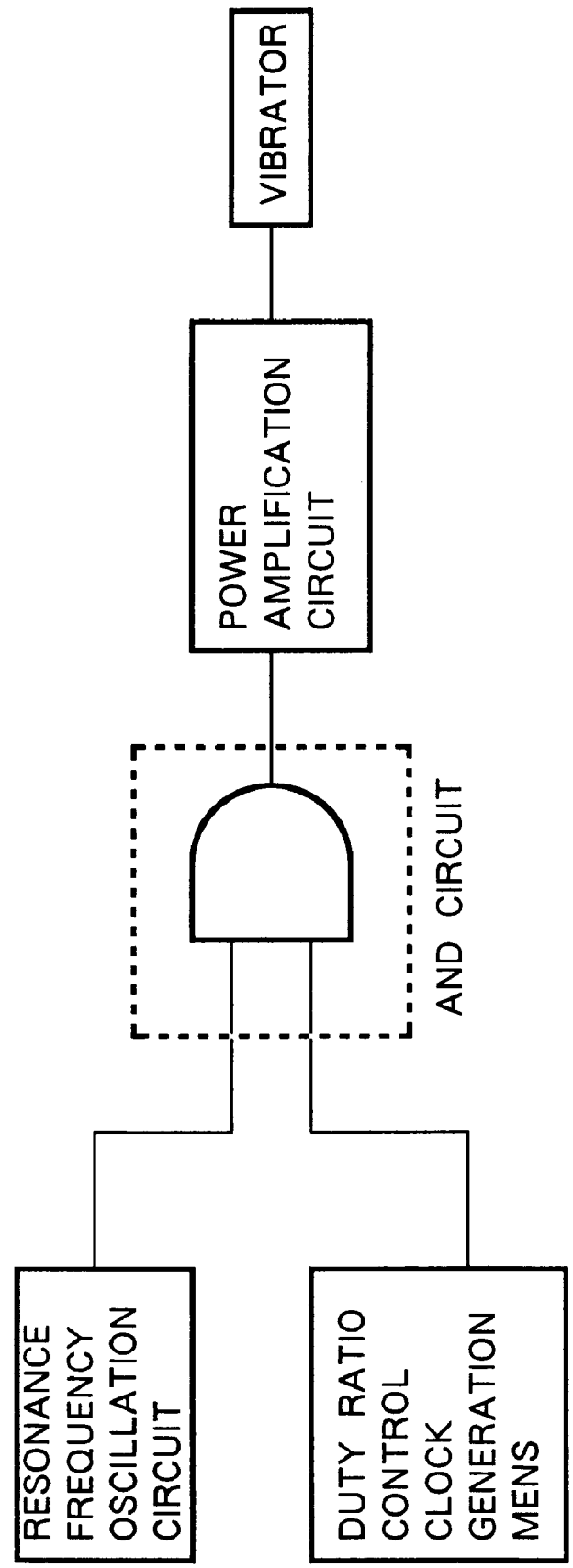
FIG. 8 is a block diagram for illustrating a driving circuit in accordance with the conventional art.

A circuit structure shown in FIG. 7 is used to realize the above-mentioned driving method. In detail, a resonance frequency oscillation circuit for oscillating with the resonance frequency Fr and a non-resonance frequency oscillation circuit for oscillating with the non-resonance frequency Fi are provided, and switching means switches the output supplied to a power amplifier alternately between the resonance frequency oscillation circuit and non-resonance frequency oscillation circuit, and the output from the power amplifier is supplied to the vibrator.

In this embodiment, duty proportional control clock generation means generates the switching signal, and this switching signal and the output from the resonance frequency oscillation circuit are supplied to the AND circuit to generate a product output, on the other hand, an inverse output of the switching signal (inverter output) and the output from the non-resonance frequency oscillation circuit are supplied to the AND circuit to generate a product output, and OR output of both product outputs is obtained to serve as the switching means.

In the above-mentioned embodiment, the driving of the powder feeder using an ultrasonic motor provided with the piezoelectric element driving source is exemplified, however, the driving method of the present invention is by no means limited to this case, and used widely as the method for driving a vibrator driven intermittently with the resonance frequency.

For example, this method can be applied to fish detection resonators used for under-water exploration and fish detection, ultrasonic range finders using ultrasonic wave in air, and ultrasonic motors, or the driving method can be applied to drive ultrasonic processing machine resonators of ultrasonic welders used for fusing and processing plastics.

In the above mentioned embodiment, the vibrator 10 is driven with the non-resonance frequency Fi through the entire inactive period Ti, however, the vibrator 10 is not necessarily driven through the inactive period Ti, but the vibrator 10 may sufficiently be driven with a non-resonance frequency only just after an ending of an active period Ta and just before the starting of the next active period Ta. Depending on the application, the vibrator 10 may be driven with a non-resonance frequency either just after or just before. For such case, it is advantageous because a driving circuit can be simple.

In the above-mentioned embodiment, the non-resonance frequency Fi=300 kHz and 10 kHz are used, as it is obvious based on this fact, Fi may be higher or lower than the resonance frequency Fr.

In the above-mentioned embodiment, two oscillation circuits of a resonance frequency oscillation circuit and non-resonance frequency oscillation circuit are provided as the driving circuit and the circuits are switched, however, the oscillation frequency may be suitably changed, for example, the oscillation frequency may be changed by changing the oscillation condition of an oscillation circuit. In detail, a method in which the oscillation frequency is changed by changing the control voltage using VCO may be used. In this case, only one oscillation circuit is sufficient for structuring the vibrator.

As it is obvious from the above-mentioned description, according to the driving method of the present invention, in driving a vibrator intermittently, the driving with a resonance frequency rises promptly and after the driving with the resonance frequency the free vibration is suppressed effectively.

The driving of a powder feeder by way of this driving method leads to the linear relationship between the duty ratio and powder feed rate, and the powder feed rate is easily controlled even in the low powder feed range.

Also, the powder feed rate is accurately controlled by the powder feeder provided with the oscillation circuit which realizes such a driving method.

What is claimed is:

1. A method for driving a vibrator of a powder feeder, said powder feeder comprising;
    a vibrator having the end being brought into elliptic motion by applying a prescribed resonance frequency to a piezoelectric element,
    a powder feed passage formed at the end of the vibrator, and
    a hopper for storing and feeding powder into the powder feed passage,
    the frequency of AC driving voltage applied to said piezoelectric element being changed alternately between said resonance frequency and a non-resonance frequency.

2. A powder feeder comprising:
    a vibrator having the end being brought into elliptic motion by applying a prescribed resonance frequency to a piezoelectric element,
    a powder feed passage formed at the end of the vibrator,
    a hopper for storing and feeding powder into the powder feed passage, and
    a circuit for applying an AC driving voltage of said resonance frequency and a non-resonance frequency to said piezoelectric element alternately.

3. A powder feeder according to claim 2, wherein said driving circuit comprises;
    a resonance frequency oscillation circuit for oscillating with said resonance frequency,
    a non-resonance frequency oscillation circuit for oscillating with said non-resonance frequency,
    switching means for switching the output alternately between the output of said resonance frequency oscillation circuit and the output of said non-resonance frequency oscillation circuit, and
    a power amplification circuit for amplifying the output from said switching means and applying it to said piezoelectric element.

4. A powder feeder according to claim 2, further comprising clock means for producing a clock pulse with a duty ratio, the clock pulse having an active period and an inactive period in one cycle.

5. A powder feeder according to claim 4, wherein said AC driving voltage with the resonance frequency is applied to the piezoelectric element during the active period and said AC voltage with the non-resonance frequency is applied to the piezoelectric element during the inactive period.

6. A powder feeder according to claim 4, wherein the duty ratio is determined by the proportion of the active period in one cycle of the clock pulse.

7. A powder feeder according to claim 2, wherein the vibrator comprises an ultrasonic motor.

8. A powder feeder according to claim 2, wherein the powder feed passage is formed of nylon tube.

9. A powder feeder according to claim 8, wherein the resonance frequency is approximately 29.4 kHz.

* * * * *